US007288501B2

(12) United States Patent
Auer et al.

(10) Patent No.: US 7,288,501 B2
(45) Date of Patent: Oct. 30, 2007

(54) PROCESS AND APPARATUS FOR THE THERMAL TREATMENT OF PULVERULENT SUBSTANCES

(75) Inventors: Emmanuel Auer, Frankfurt (DE); Peter Biberbach, Rodenbach (DE); Michael Gross, Frankfurt/Main (DE); Andreas Gutsch, Ranstadt (DE); Markus Pridöhl, Grosskrotzenburg (DE); Karsten Ruth, Alzenau (DE); Edwin Staab, Geiselbach (DE)

(73) Assignee: Umicore AG & Co., KG, Hanau (DE)

( * ) Notice: Subject to any disclaimer, the term of this patent is extended or adjusted under 35 U.S.C. 154(b) by 390 days.

(21) Appl. No.: 10/131,227

(22) Filed: Apr. 25, 2002

(65) Prior Publication Data

US 2002/0160909 A1 Oct. 31, 2002

(30) Foreign Application Priority Data

Apr. 25, 2001 (DE) ................ 101 20 484

(51) Int. Cl.
*B01J 23/00* (2006.01)
*B01J 21/18* (2006.01)

(52) U.S. Cl. ............ 502/182; 502/180; 502/184; 502/185; 502/300

(58) Field of Classification Search ........... 502/53, 502/56, 305–355, 180, 182, 183, 184, 185; 422/198, 200
See application file for complete search history.

(56) References Cited

U.S. PATENT DOCUMENTS

| 3,565,408 A | | 2/1971 | Lothar et al. | |
|---|---|---|---|---|
| 3,565,409 A | * | 2/1971 | Beck | 266/133 |
| 3,904,355 A | * | 9/1975 | Takahashi | 423/152 |
| 4,374,092 A | * | 2/1983 | Marquess et al. | 422/199 |
| 4,624,937 A | | 11/1986 | Chou | |
| 4,668,493 A | * | 5/1987 | Levin | 423/349 |
| 4,696,772 A | | 9/1987 | Chou | |
| 5,063,110 A | * | 11/1991 | Bailly et al. | 428/402 |
| 5,132,102 A | | 7/1992 | Cohen et al. | |
| 5,225,458 A | * | 7/1993 | Bailly et al. | 523/220 |
| 5,273,585 A | * | 12/1993 | Shoga et al. | 118/719 |
| 5,298,090 A | * | 3/1994 | Garg et al. | 148/208 |
| 5,342,455 A | * | 8/1994 | Bonner et al. | 148/208 |
| 5,417,774 A | * | 5/1995 | Garg et al. | 148/208 |
| 5,421,854 A | | 6/1995 | Kodas et al. | |
| 5,759,499 A | * | 6/1998 | Bourdet et al. | 422/199 |
| 5,782,952 A | | 7/1998 | Diaz et al. | |
| 5,852,768 A | | 12/1998 | Jacobsen et al. | |
| 5,871,806 A | * | 2/1999 | Shoga et al. | 427/8 |
| 6,294,138 B1 | * | 9/2001 | von Hippel et al. | 422/200 |

FOREIGN PATENT DOCUMENTS

| DE | 221 160 A | 4/1985 |
|---|---|---|
| DE | 271 281 A | 8/1989 |
| JP | 63319053 A | 12/1998 |

\* cited by examiner

*Primary Examiner*—Cam N. Nguyen
(74) *Attorney, Agent, or Firm*—Venable LLP; Thomas G. Wiseman

(57) ABSTRACT

Process and apparatus for the thermal treatment of pulverulent substances, in which the pulverulent substance is dispersed in a carrier gas and is passed in a continuous manner through a heated reactor where it is thermally treated and is then quenched by a cooling medium and is collected in a gas-solids separating unit.

15 Claims, 1 Drawing Sheet

PROCESS AND APPARATUS FOR THE THERMAL TREATMENT OF PULVERULENT SUBSTANCES

BACKGROUND OF THE INVENTION

1. Field of the Invention

The invention relates to a process and an apparatus for the thermal treatment of pulverulent substances.

2. Description of Related Art

Known heat treatment methods for pulverulent substances take place in batch processes and therefore require long treatment times and are difficult to automate. Moreover, a disadvantage with these known furnace heat treatment processes, in which the material being heat treated is introduced into the furnace in dishes, pans or other containers, is the formation of agglomerations, coarse lumps and caking of the pulverulent substances as well as the occurrence of inhomogeneities that are caused by a non-uniform heat treatment due to temperature gradients in the furnace chamber, as well as by variable gas accessibility depending on the position in the furnace chamber.

Known revolving tubular furnaces have considerable disadvantages in terms of energy consumption due to the large dead volume. Furthermore the material being heat treated is contaminated by parts of the tubing and adhering catalyst residues.

According to EP 0 591 881 1 (DuPont) it is known to produce palladium and palladium oxide powders with particle sizes of around 1 micron by decomposing a Pd-containing aerosol in a heated wall reactor.

This process cannot be used for supported catalysts containing noble metals.

DE 19545455 (Degussa) describes a process for the production of noble metal powders by heat treatment of an aerosol in a flame reactor.

A disadvantage of the flame-heated reactor system is an irregular temperature/time profile as well as the necessity to feed in fuel gases and air, or oxygen, to produce the flame. As a result, the system is disadvantageously complex.

EP 0 537 502 (Degussa) describes a post-treatment process for noble metal powders in a heated wall reactor, in which the noble metal powder is nebulised in a carrier gas. On account of the high density the powder mist is inhomogeneous however, with the result that particle-particle contact and thus agglomerations occur during the heat treatment.

DD 286523 (Leunawerke) describes a process for the production of a supported silver catalyst by heat treatment of an inert carrier material that has been impregnated with a silver salt solution.

The decomposition of the silver salt on the carrier material is however incomplete, with the result that an additional heating step is necessary in order to activate the catalyst.

JP 63319053 (Tanaka) describes a plasma process for the heat treatment of electrocatalysts for fuel cells, which is carried out in a quartz tube formed in the shape of a coil.

Although this process leads to alloyed noble metal catalysts, it is very complicated and expensive.

RO 54548 describes a continuous heat treatment process in which the catalyst material is dispersed in a carrier gas and is then treated in an electric arc.

According to the prior art, such heat treatments of pulverulent substances are carried out for example in revolving tubular furnaces or stationary furnaces.

The disadvantage of these thermal treatments (calcination) is that, on account of the thermal stress of the material, the metal crystallites applied to the carrier become mobile and sinter.

A thermal treatment of pulverulent catalysts at high temperatures without such sintering effects with simultaneous alloy formation, fixing of the metal on the support, and decomposition of metal oxides or the removal of surface functionalities is not possible according to the prior art.

According to U.S. Pat. No. 4,624,937 or U.S. Pat. No. 4,696,772 it is known to remove surface functionalities by treating a carbon-based carrier material by oxidation with $HNO_3$ and subsequent thermal treatment.

A disadvantage of this process is that it includes a further complicated step involving the production of metal-containing, pulverulent catalysts.

There is therefore a need to develop a process for the thermal treatment of pulverulent substances that does not have these disadvantages.

BRIEF SUMMARY OF THE INVENTION

The present invention accordingly provides a process for the thermal treatment of pulverulent substances that is characterised in that the pulverulent substance is dispersed in a carrier gas and is passed in a continuous manner through a heated reactor where it is thermally treated and is then quenched by a cooling medium and is collected in a gas-solids separating unit.

Nitrogen, argon, helium, hydrogen, carbon monoxide and mixtures thereof may be used as carrier gas.

The residence time in the zones 4 and 6 of the reaction section may total 0.2 to 11 seconds.

The temperature may range from 200° to 1850° C.

As pulverulent substances there may be used carbon blacks, activated charcoals, graphites, fibre-shaped graphitic nanotubes, inorganic oxides such as aluminium oxide or silicon dioxide, inorganic nitrides such as aluminium nitride or boron nitride, or mixtures thereof.

According to the invention, the pulverulent substance may be dispersed in a first carrier gas and passed continuously by means of a second carrier gas through the reactor and is there thermally treated, specially cooled and collected in a gas-solids separating unit.

The dispersion unit may be operated with inert gases such as Ar, Xe, He, $CO_2$, Ne, $N_2$, and mixtures thereof.

The second carrier gas may be a reducing gas ($H_2$, CO, forming gas), an oxidising gas ($CO_2$, air, steam) and mixtures thereof, and may also be diluted with nitrogen.

The pulverulent substance may contain nanoscale particles of a metal component, the nanoscale particles of the metal component being smaller than 200 nm, preferably smaller than 50 nm.

As metal component there may be used Au, Ag, Pt, Pd, Rh, Ru, Ir, Ni, Cu, Sn, Fe, Co, Cr, V, Nb, Ta, Zn, Pb, Te, Bi, Sb, Ti, Mn and mixtures thereof.

The pulverulent substance may consist of spherical, fibre-shaped, tubular, irregularly shaped or porous and amorphous materials having a high specific surface.

The pulverulent substance may consist of carbon black, of activated charcoal that may be chemically or thermally activated, or carbon modifications such as for example graphite, as well as fullerenes, or single-wall or multi-wall carbon nanotubes.

The pulverulent substance may consist of inorganic oxides, nitrides or glasses.

The pulverulent substance may consist of metals.

The metal components may be fixed on the pulverulent substance and/or in the case of several metals may be alloyed and/or individual metals in the case of several metals may be segregated and/or reduced and/or altered as regards their crystallite size and/or the surface of the pulverulent substance may be chemically modified.

According to the invention, the crystallite size of the one or more metals contained in the system may be altered. The metal-containing phase may be thermally fixed on the carrier material or may be newly distributed.

Nobel metal-containing supported catalysts are characterised in that the metals are fixed and/or in the case of several metals are alloyed and/or individual metals in the case of several metals are segregated and/or reduced and/or oxidised and/or are altered as regards their crystallite size and/or the surface of the pulverulent substance is chemically modified.

The carrier gas may already be preheated at the point where the solids are added.

The relevant temperatures may be separately adjusted in each zone. The temperatures may range from 200° to 1850° C.

The heat may be supplied to the system through the wall of the reactor.

The heat may be supplied to the pulverulent substance or to the mixture of pulverulent substance and gas directly via an energy source.

The energy may be supplied by chemical combustion, by microwave radiation, by induction or by exothermic reactions.

The carrier gas may consist of inert, oxidising or reducing gases or gas mixtures.

The residence time of the pulverulent substance may be adjusted by the carrier gas stream, the reactor geometry, by the temperatures, by the metering of the solids, and by the direction in which the solids are metered.

The hot stream consisting of pulverulent substance and gas may be cooled by the addition of cold gases, in which the latter may in each case be oxidising, reducing or inert gases and/or gas mixtures.

The pulverulent substance may be separated from the mixture consisting of gas and pulverulent substance by means of cyclones, filters, gas washers or eletrostatic separators.

The pulverulent substance may be cooled and/or specially passivated under an inert atmosphere so that it can be safely handled.

The carrier gas may be recycled or reused. The pressure in the system may be varied between −5 mbar and 5 mbar excess pressure.

The invention also provides an apparatus for carrying out the process according to the invention.

DETAILED DESCRIPTION OF THE INVENTION

Figure 1:
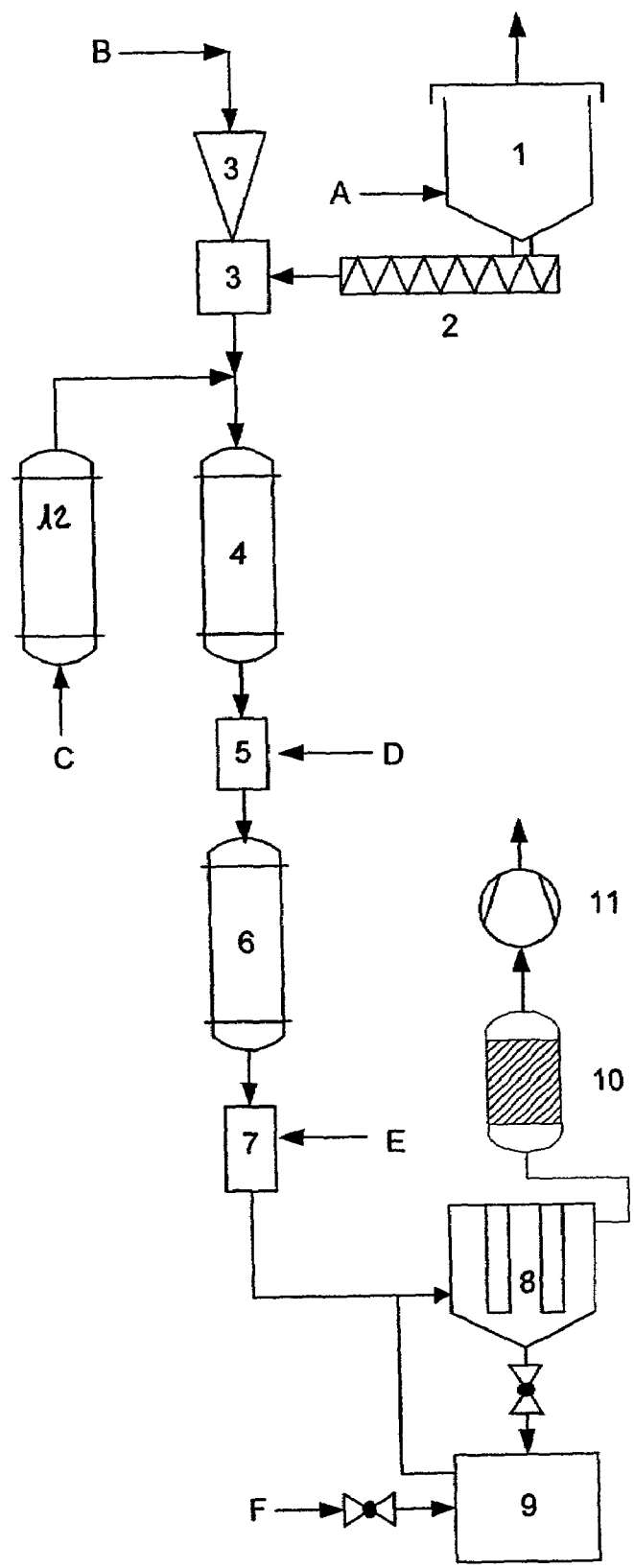
FIG. 1 shows an apparatus for carrying out the process.

This apparatus is characterised in that it comprises a storage container (1), a conveying screw (2) that together with a carrier system forms metering scales that are connected to an injector unit (3), the injector unit (3) being arranged at the upper end of a reaction section (4 to 7), and the reaction section (4 to 7) consisting of a heating zone (4), a conditioning unit (5), a second heating zone (6) and a quenching section (7).

Carrier gas may be fed into the reaction section (4 to 7) via a carrier gas preheating section (12).

The product is separated by means of a filter (8) and a product collecting vessel (9). The carrier gas is then scrubbed by means of the gas washer (10), the transportation and pressure in the device being regulated by means of the valve (11).

The process according to the invention as well as the apparatus according to the invention are described and illustrated in more detail with the aid of FIG. 1.

According to FIG. 1, the pulverulent substance is covered with the starting compounds and conditioned. The preliminary product produced in this way is stored in the 10 l capacity storage container (1).

The metering device and the conveying screw may be charged with inert or reducing gases (1-3 m$^3$/h) or their mixtures (A).

According to the invention the preliminary product is fed gravimetrically or volumetrically with a metering scales (1 and 2) or a simple conveying screw (2) to the gas disperser (3). The ratio of the injector gas stream (B) and of the substance stream of the preliminary product as well as in each case the substance properties of the preliminary product and of the dispersing gas (B) permit the production of a suitable solids-gas dispersion that is mixed at a rate of 0.1-10.0 kg/hour with the carrier gas stream (C) at the upper end of the first heating zone (4). Suitable as dispersing gases (B) are inert or reactive (e.g. oxidising, reducing) gases or their mixtures, the volumes of which may be varied between 1 and 5 Nm$^3$/hour.

The carrier gas stream (C) is preheated up to 500° C. in a further heating zone (12). The volume stream may be adjusted to a rate of between 1 and 20 Nm$^3$/hour depending on the required residence time. The particle dispersion flows together with the carrier gas stream (C) through the tubular reactor and thereby traverses the two heating zones (4) and (6), which may be individually adjusted to temperatures of between 200° and 1800° C.

The desired supported catalyst is produced by a single or double brief heating treatment in the heating zones (4, 6), in which the metal or the metals or their alloys are generated or released or distributed and/or fixed on the carrier surface and/or in the pores of the carrier material.

Between the two heating zones (4) and (6) a further reactive or inert gas or gas mixture (D) may be fed at a rate of 2-20 Nm$^3$/hour to the conditioning zone (5), in order to reduce the residence time in the second heating zone (6) independently of the residence time in the first heating zone (4), or to cool the product in the mean time or to admix a reactive component that leads to a further reaction in the heating zone (6).

Reactive or inert quenching gases or their mixtures (E) are added at a rate of 5-60 Nm$^3$/hour to the quenching zone (7) in order to reduce the temperature to 50-400° C. The use of reactive quenching gases or quenching gas mixtures (E) permits a further modification of the surface chemistry and reactivity of the supported catalyst.

The finished supported catalyst particles are separated in a filter, cyclone or electrostatic separator (8). The waste gas may be purified in gas washers (10). The 10 l capacity collecting vessel (9) allows the further cooling and storage of the product under inert or reducing conditions, depending on the choice of gas or gas mixture (F) with which the vessel is charged. By means of an appropriate pressure regulation and with the aid of the fan (11) the pressure in the apparatus may be varied and the conveyance may be assured.

The following gases or their mixtures may be used as gas: nitrogen, argon, helium The following gases or their mixtures may be used as gas B: $N_2$, Ar, He, air, $CO_2$, CO, $H_2$ The following gases or their mixtures may be used as gas C: air, $N_2$, He, $H_2$, Ar, CO, $CO_2$, $O_2$, $O_3$ The following gases or their mixtures may be used as gas D: air, $N_2$, He, Ar, $H_2$, CO, $CO_2$, $O_2$, $O_3$, $SO_2$, $NO_x$, $H_2O$-steam The following gases or their mixtures may be used as gas E: air, $N_2$, He, Ar, $H_2$, CO, $CO_2$, $O_2$, $O_3$, $SO_2$, $NO_x$, $H_2O$-steam The following gases or their mixtures may be used as gas F: $N_2$, air, $H_2$, He, Ar, CO By means of the process according to the invention it is possible to thermally treat metal-containing pulverulent substances that may also contain mixtures of several metals. The object of this thermal treatment may be the decomposition of metal oxides to metals, the formation of alloy phases, the fixing of the metal on the pulverulent substance or—in the case of carbon-based pulverulent substances—the removal of functional groups on the surface of the pulverulent substance.

The process according to the invention is characterised in that it obviates the disadvantages of the prior art. By means of the process according to the invention, substances (catalysts) can be thermally treated at very high temperatures without sintering effects. The process according to the invention is furthermore superior to the processes described in U.S. Pat. No. 4,624,937 or U.S. Pat. No. 4,696,772 since no complicated treatment of the pulverulent substance is necessary.

The production according to the invention of the supported catalyst is carried out as follows:

The support is first of all homogeneously covered with the metals and dried, as described in the literature (GB 1163479).

According to the invention, the carrier material covered in this way is then gravimetrically or volumetrically metered via a screw device into a gas disperser, from which a gas dispersion of the carrier particles covered with metal is removed and continuously fed to the tubular reactor. Suitable as dispersing gases are inert, oxidising or reducing gases or gas mixtures. In addition, the metering container and the metering system may be charged with inert or reducing gases or gas mixtures. The particle dispersion together with the inert, reducing or oxidising carrier gas or carrier gas mixture flows through the tubular reactor and thereby traverses the various heating zones, the conditioning zone as well as the quenching zone. As a result of the single or multiple brief heat treatment, the desired catalyst is distributed and/or fixed by generation, release and/or alloying of metals on the carrier surface and/or in the pores of the carrier material. In the quenching section the substance and phase conversion is stopped by rapid cooling with suitable gases, in which inert or specifically reactive gases or gas mixtures may be used to adjust the surface chemistry and reactivity. The finished supported catalyst particles are separated in filters, cyclones, electrostatic separators or in gas washers.

The invention claimed is:

1. A process for the thermal treatment of pulverulent substances comprising dispersing the pulverulent substances in a first carrier gas forming a gas-solids mixture and conveying the dispersed pulverulent substances by means of a second carrier gas in a continuous manner through a heated reactor under treatment conditions, then quenching with a cooling medium and collecting the thermal treated pulverulent substances in a gas-solids separating unit, wherein the first and second carrier gas each is independently selected from the group consisting of nitrogen, argon, helium, hydrogen, carbon dioxide, carbon monoxide and mixtures thereof, and the pulverulent substances are selected from the group consisting of carbon blacks, activated charcoals, graphites, fiber-shaped graphitic nanotubes, supported catalysts, metal containing supported catalysts, supported catalyst precursors, metal containing supported catalyst precursors and mixtures thereof.

2. The process according to claim 1, wherein the pulverulent substances are supported catalysts or supported catalyst precursors having carrier surfaces and metal components wherein the metal components are selected from the group consisting of Au, Ag, Pt, Rh, Ru, Ir, Ni, Cu, Sn, Fe, Co, Cr, V, Nb, Ta, Zn, Pb, Te, Bi, Sb, Ti, Mn, Zr and mixtures thereof.

3. The process according to claim 2, wherein the metal components are fixed on the carrier surfaces of the supported catalysts or on the carrier surfaces of the supported catalyst precursors.

4. The process according to claim 2 wherein when several metal components are present on the carrier surfaces of the supported catalysts, the metal components are alloyed and/or segregated.

5. The process according to claim 2 wherein the metal components are reduced and/or oxidized.

6. The process according to claim 2 wherein the metal components crystallite size is altered.

7. The process according to claim 2, wherein the carrier surfaces are chemically modified.

8. The process according to claim 1, wherein the pulverulent substances are further characterized as spherical, fiber-shaped, tubular, irregularly shaped or porous and amorphous materials having a high specific surface area.

9. The process according to claim 1, wherein the first carrier gas is preheated at the point where solids are added.

10. The process according to claim 1, wherein the process occurs in reaction zones where temperatures in each zone may be separately adjusted.

11. The process according to claim 1, wherein the heated reactor has heating zones with walls and the heat is supplied through the walls.

12. The process according to claim 1, wherein the heat is supplied to the pulverulent substances or to the mixtures of pulverulent substances directly via an energy source.

13. The process according to claim 12, wherein the energy source is selected from the group consisting of chemical combustion, microwave radiation, induction and exothermic reactions.

14. The process according to claim 1, wherein the thermal treated pulverulent substances are separated from the gas-solids mixture by cyclones, filters, gas washers or electrostatic separators.

15. The process according fo claim 1, wherein the thermal treated pulverulent substances are cooled and/or passivated under an inert atmosphere.

* * * * *